United States Patent [19]

Hackmann

[11] Patent Number: 5,168,361
[45] Date of Patent: Dec. 1, 1992

[54] ARRANGEMENT FOR THE TRANSMISSION OF DIGITAL TELEVISION SIGNALS

[75] Inventor: Hartmut Hackmann, Hamburg, Fed. Rep. of Germany

[73] Assignee: U.S. Philips Corporation, New York, N.Y.

[21] Appl. No.: 452,097

[22] Filed: Dec. 15, 1989

[30] Foreign Application Priority Data

Dec. 16, 1988 [DE] Fed. Rep. of Germany ....... 3842361

[51] Int. Cl.$^5$ .............................................. H04N 5/14
[52] U.S. Cl. .................................... 358/160; 358/188
[58] Field of Search ...................... 358/22, 21, 13, 181, 358/183, 185

[56] References Cited

U.S. PATENT DOCUMENTS 4,746,982 5/1988 Seen et al. ............................ 358/181

FOREIGN PATENT DOCUMENTS 2155729 9/1985 United Kingdom ................ 358/183

OTHER PUBLICATIONS

Danbury et al., "Small area networks using serial data transfer, Part 1-the I'Cand Clips" 8029 Electronics Engineering vol. 56 Jan., 1984.
Stone, Harold S. "Microcomputer Interfacing" Addison-Wesley Publishing Co. 1983 pp. 100–107.

*Primary Examiner*—James J. Groody
*Assistant Examiner*—David E. Harvey
*Attorney, Agent, or Firm*—Edward W. Goodman

[57] ABSTRACT

In an arrangement for transmitting digital television signals from a plurality of signal sources to at least one signal sink, an interconnection of several video signal sources which are of a simple structure and simple to operate and can be used universally and reliably for different operating modes is enabled by a picture signal line group (7) for the transmission of luminance and color signals encoded as digital picture data from always one optional signal source of the signal sources (1, 2, 3, 4), a synchronizing signal line group (8) for the transmission of a picture data clock siganl and a line synchronizing signal from a clock signal source (45)

and also an access-control (9) having for each signal source (1, 2, 3, 4) an access-control circuit (13, 23, 33, 43) which supplies an inhibit signal from a output (15, 25, 35, 45) when an inhibit signal is applied to an input (14, 24, 34, 44) or when a signal from the associated signal source (1, 2, 3, 4) is available there for transmission and which when an inhibit signal is present at its input (14, 24, 34, 44) inhibits the associated signal source (1, 2, 3, 4) for the supply of digital picture data in a predetermined temporal correlation with the picture data clock signal and enables it in like manner after the inhibiting signal has disappeared, all the access-control circuits (13, 23, 33, 43) having their inputs (14, 24, 34, 44) and their outputs (15, 25, 35, 45) incorporated in a chain circuit which determines the priority of the signal sources (1, 2, 3, 4) for the transmission.

8 Claims, 1 Drawing Sheet

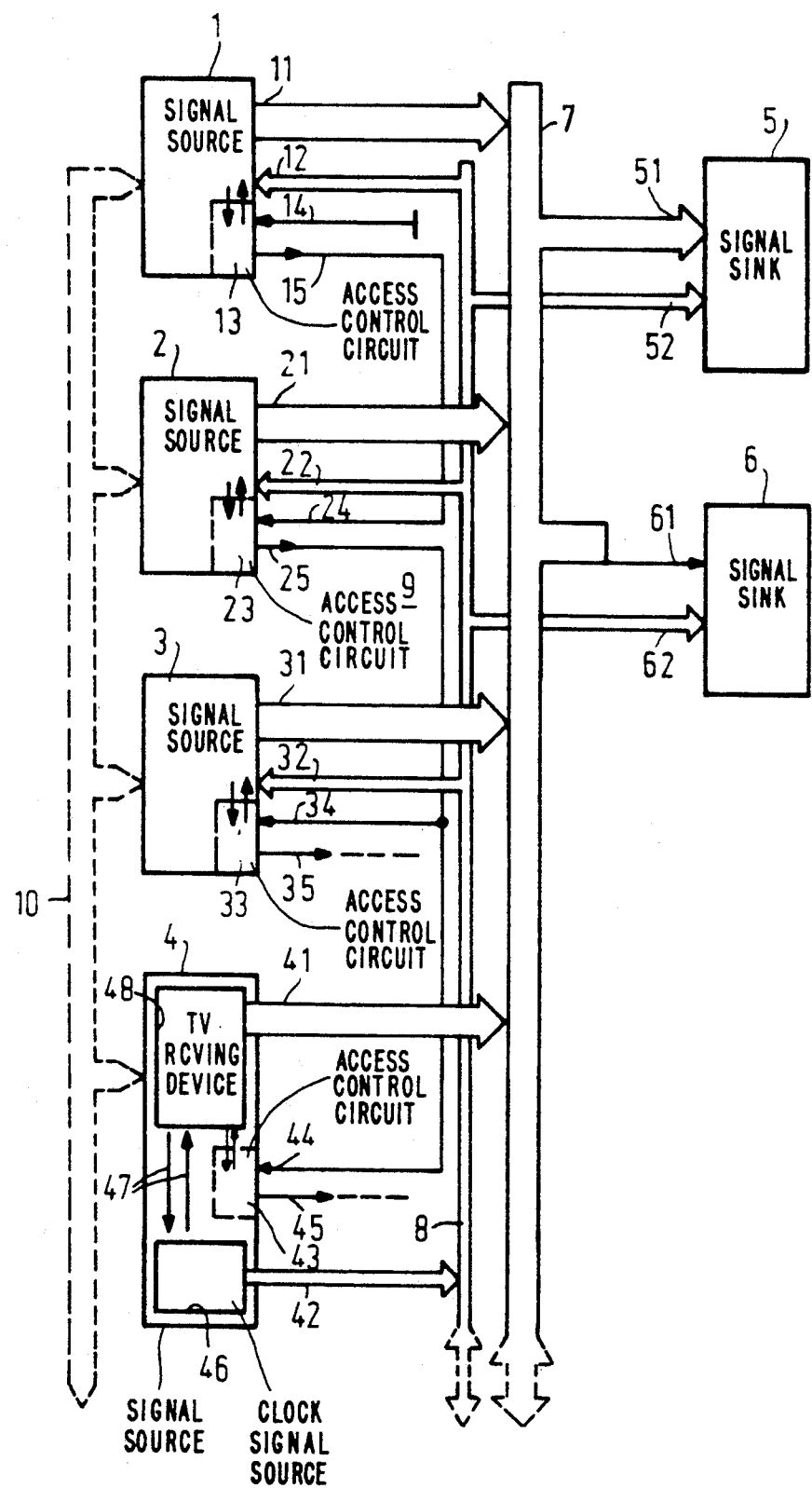

ARRANGEMENT FOR THE TRANSMISSION OF DIGITAL TELEVISION SIGNALS

BACKGROUND OF THE INVENTION

1. Field of the Invention

The invention relates to an arrangement for transmitting digital television signals from a plurality of signal sources to at least one signal sink.

2. Description of the Related Art

The periodical "Valvo Technische Information 881031", "Digitale Videosignalverarbeitung, 2. Teil" describes circuits for digital video signal processing with digitizing of the analog CVBS-signal. More specifically, section 2.1., pages 5 and 6 and also FIG. 3 describe a signal source switch which is used to choose from a maximum of three composite color input signals. In a television receiver, a choice can be made between an internal composite color signal supplied by the intermediate frequency demodulator and two composite CVBS-signals coming from the exterior. From section 1, more specifically page 4, left hand column, third paragraph from the bottom, and also FIG. 2, it can be seen that digital signals such as, for example "MAC" or "ISDN" signals can be fed into a transmission path between a digital multi-standard decoder and a digital video processor.

However, the cited periodical does not contain any reference to an efficient embodiment of the feed-in of digital signals.

SUMMARY OF THE INVENTION

The invention has for its object to provide an arrangement which enables combining a plurality of video signal sources which are of a simple construction and are simple to operate and can be universally used for different operating modes in combination with a reliable functioning.

According to the invention, this object is achieved by means of an arrangement of the type defined in the opening paragraph by a picture signal line group for the transmission of luminance and color signals encoded as digital picture data from always one optional signal source from the signal sources, a synchronizing signal line group for the transmission of a picture data clock signal and a line synchronizing signal from a clock signal source, and also an access control having for each signal source an access-control circuit which supplies an inhibit signal from an output when an inhibit signal is applied to an input or when a signal from the associated signal source is available there for transmission, and which when an inhibit signal is present at its input inhibits the associated signal source for the supply of digital picture data in a determined temporal correlation with the picture data clock signal and enables it in like manner after the inhibiting signal has disappeared, and the access-control circuits having their inputs and their outputs incorporated in a chain circuit which determines the priority of the signal sources for the transmission.

Consequently, the arrangement according to the invention provides a circuit configuration which is similar to a "data bus" in which the digital picture data representing the picture signals are transmitted via a separate line group, the picture signal line group, which interconnects all the outputs of all the signal sources and also the inputs of all the signal sinks. A digital luminance signal and also digital color signals are associated with the picture data. The arrangement according to the invention allows a transmission of these signals in any data format.

In addition to the picture signal line group, the arrangement according to the invention includes a synchronizing signal line group, through which the picture data clock signal and a line synchronizing signal which similar to this picture data clock signal gives the time for the function of all the signal sources or signal sinks connected to the arrangement according to the invention. Whereas, however, the picture data can originate from always one optional signal source, the picture data clock signal and the line synchronizing signal are fed-in from one specific clock source which is compulsory for all the signal sources and signal sinks. The signals on the synchronizing signal line group form in a simple and reliable manner a picture line-coupled signal processing system from all the signal sources and signal sinks which are interconnected by the arrangement of the invention.

To ensure that at any moment unambiguous picture data are present on the picture signal line group, an access control is further provided in accordance with the invention, which ensures that at any moment only one of the signal sources feeds picture data into the picture signal line group whereas simultaneously the supply of picture data from the other signal sources is interrupted. The chain circuit of access control circuits to each one of the signal sources, from which the access control is formed, permits a simple, decentralized determination and performance of a priority, that is to say a hierarchy of the individual signal sources relative to each other. A signal source which applies the picture data to the picture signal line group automatically inhibits all the signal sources of a lower hierarchy via the chain circuit. So as to trigger this inhibiting procedure, the inhibiting signal of the most significant signal source is looped from its access-control circuit through the access-control circuits of all the signal sources of a lower rank, and more specifically at a predetermined time rate which is controlled by the picture data clock signal. Considered from each one of the signal sources, the instant at which the individual signal sources of decreasing significance are inhibited can accurately be determined; in particular the signal sources and their access control circuits can be given a time program to the effect that the inhibit signal of one of the signal sources is looped through the chain circuit at the correct moment considered from a predetermined switching instant at which the signal source initiating the inhibiting signal will start the transmission of its picture data. For each signal signal source or each associated access-control circuit, respectively, it is possible to determine a preliminary time interval in the form of a predetermined multiple of the period of the picture data clock signal which is to elapse between the instant at which the inhibit signal is supplied or received and the switching instant. Independent of the origin of the inhibit signal for said switching procedure and independent of the position of the signal source in the chain circuit determining the priority, each one of the access-control circuits then switches its associated signal source over at exactly the switching instant.

The accurate control of the priority of the signal sources enables beyond of the switch-over between the television signals of different program sources, for example at the switch from one television program watched by the user to another program, a picture element-accurate switch between two or a plurality of signal sources within one line of the television picture, without interferences occurring in the picture at the transition of one television signal to another. This also provides that via the access control in addition to the channel selection also a, for example, "picture-in-picture" mode is possible, without the need of additional devices or circuits. Thus, a simple, reliable and universal control of the priority in the combination of a plurality of video signal sources is achieved.

Preferably, the arrangement according to the invention can be connected to a further control system, more specifically a system known as the I$^2$C-bus. A "static" control of the signal sources and signal sinks is then preferably effected via this bus, i.e. a control which is not correlated with the picture data clock signal, whereas the access control in accordance with the invention performs the "dynamic" priority control described in the foregoing. It is thus also possible to provide the chain circuit of the access-control circuit with branches so that the I$^2$C-bus can select a plurality of signal sources which as regards the "dynamic" priority control are of equal rank.

In a further development of the invention, further synchronizing and/or control signals, more specifically a picture synchronizing signal, can be transmitted via the picture signal line groups. The picture synchronizing signal is then not centrally preset by the clock signal source but is individually applied together with the picture signal from each of the signal sources. This simplifies, for example, the adaptation of a picture display device to different phase positions of the picture synchronizing signals of different signal sources and consequently different program sources or transmitters. In addition, it is possible to supply the picture synchronizing signals from signal source other than the picture data.

In addition, in the arrangement in accordance with the invention, it is possible to transmit, as one of the further synchronizing and/or control signals via the synchronizing signal line group and there more specifically in combination with the picture data clock signal and also via the picture signal line group, a signal which represents a reference for the phase of the picture data, insofar this phase is not unambiguously supplied by the picture data clock signal, for example in the situation in which the frequency of the picture data clock signal is a multiple of the repetition frequency of the picture data.

Preferably, lines which are arranged for the transmission of the line and/or the picture synchronizing signals can be used for the additional, time-interleaved transmission of further signals. Consequently these lines can additionally be utilized as, compared with the picture signal line groups, they have only a low data transmission rate. Preferably, a digitally encoded signal for the value of the frequency or the period duration of the picture data clock signal can be transmitted via the line for the line synchronizing signal. Information about the instantaneously present picture data, for example about a just transmitted field can in particular be conveyed via the line for the picture synchronizing signals. This signal or further signals can be time-interleaved in a simple manner with the line synchronizing signal and also the picture synchronizing signal.

In a further development the clock signal source is comprised in one specific source of the signal sources. The picture data clock signal and the line synchronizing signal are then always supplied by this specific signal source, whereas the picture data can also originate from the other signal sources. The overall system of signal sources and signal sinks, interconnected by the arrangement according to the invention is then always synchronized with this one specific signal source; as regards their phase and frequency, the picture data clock signal and the line synchronizing signal are always based on the television signal produced by this specific signal source. If, for example, a television broadcast receiving device and a video recording and display apparatus each form a signal source and a picture display device forms a signal sink, all these components can advantageously be controlled by a picture data clock signal and a line synchronizing signal derived from the television signal received by the television broadcast receiving device.

Advantageously, the picture data assigned to the luminance signal can be transmitted in parallel via a first number of lines and the picture data assigned to the color signals can be transmitted in parallel or in time-division multiplex via a second number of lines of the picture signal line group. Although basically the television signals can be transmitted in any optional format, this solution has the advantage of combining a high data rate at a technically adequately controllable frequency of the picture data clock signal and a limitation of the number of lines with simultaneously a good resolution of the color and luminance values in the transmitted picture. In this situation account is taken of the fact that the majority of picture data are assigned to the luminance signal, whereas the color signals have a correspondingly lower number of picture data, as a rule in the form of a lower repetition frequency of individual color values, but less in a reduction in the resolution of these color values. If the color signals are transmitted in time-division multiplex, a complete picture data set—each consisting of at least a value for the luminance signal and each color signal—is not present until after several periods of the picture data clock signal, more specifically not until after several periods of the data rate of the luminance signal.

In addition to the control and synchronization by the synchronizing and/or control signals and devices described, the beginning and also the ends of a transmission of picture data from a signal source via the picture signal line group can be marked by given, unambigously predetermined and recognisable data words.

BRIEF DESCRIPTION OF THE DRAWING

With the above and additional objects in mind as will hereinafter appear, the invention will be described with reference to the accompanying drawing in which the sole Figure shows a block-schematic diagram of an arrangement according to the invention.

DESCRIPTION OF THE PREFERRED EMBODIMENT

The Figure is a block-schematic circuit diagram of an arrangement includes four signal sources 1 to 4 and two signal sinks 5, 6. Each signal source 1, 2, 3 or 4 has one picture signal output 11, 21, 31 or 41, respectively, connected to a picture signal line group 7 which itself is connected to the respective signal sinks 5 and 6 via respective picture signal inputs 51 and 61. In addition, a synchronizing signal line group 8 connects a synchronizing signal output 42 of the signal source 4 to synchronizing signal inputs 12, 22 and 32, respectively, of the remaining signal sources 1 to 3 and also synchronizing signal inputs 52 and 62 respectively, of the respective signal sinks 5 and 6.

The present embodiment further includes an access control 9 which for each signal source 1, 2, 3, 4 comprises an access-control circuit 13, 23, 33 and 43, respectively, which are shown in the Figure in the form of block diagrams as part of the signal sources 1, 2, 3 and 4, respectively. Each access-control circuit 13, 23, 33 and 43, respectively, has a respective input 14, 24, 34 and 44 and also a respective output 15, 25, 35 and 45. Each one of the respective access-control circuits 13, 23, 33 and 43 has at its respective input 14, 24, 34 and 44 a picture data clock signal-time correlated logic combination of an inhibit signal, and also an internal inhibit signal which is applied to it by its associated signal source and which indicates that in the associated signal sources 1, 2, 3 and 4, respectively, a signal is present for transmission via the picture signal line group 7, with an inhibit signal supplied from its respective output 15, 25, 35 and 45. The internal inhibit signal is symbolized by an arrow pointing into the associated access-control circuits 13, 23, 33 and 43, respectively.

The inhibit signals assume a high logic level (value "1") when the access-control circuits 13, 23, 33 and 43, respectively, receiving this inhibit signal, inhibit their associated respective signal sources 1, 2, 3 and 4 for the supply of digital picture data, and assumes a low logic level (value "0") (which corresponds to the disappearance of the inhibit signal), when the respective associated signal sources 1, 2, 3 and 4 are enabled. Inhibiting or enabling is effected via an active connection, for example a line, which in the Figure is represented by an arrow leaving from the respective access-control circuits 13, 23, 33 and 43 but still remaining within the associated respective signal sources 1, 2, 3 and 4.

When one of the signal sources 1, 2, 3, 4, for example the signal source 1, reports to the associated access-control circuit 13 that a signal is present for transmission via the picture signal line group 7, this is effected in an assignment which is time-correlated with the picture data clock signal, to an instant somewhere in the future at which this transmission is to start. An inhibit signal is then supplied from the output 15 of the access-control circuit 13 after a predetermined period of time correlated with the picture data clock signal has elapsed, which inhibit signal is applied to the input 24 of the access-control circuit 23 of the signal source 2. The inhibit signal at the input 24 achieves that the signal source 2 is inhibited by the access-control circuit 23 for the supply of digital picture data from the picture signal output 21 after a predetermined time interval which is time-correlated with the picture data clock signal has elapsed. This time interval and the time duration in which an inhibit signal applied to the access-control circuit 13 becomes effective at its input 15 correspond when added together to the time interval located between the instant at which the inhibit signal is applied to the access-control circuit 13 and the instant at which the transmission of the picture data via the picture signal output 11 to the picture signal line group 7 is to start. Inhibiting the signal source 2 and also enabling the signal source 1 which has priority over the signal source 2 is then effected at the same instant, more specifically determined accurately and compulsarily by the picture data clock signal. This enables a switch from one to the other signal source (from 2 to 1) in a defined manner at an accurately determined instant without overlap of the data streams and without an undefined intermediate interval.

After a further period of time which is also time-correlated with the picture data clock signal, an inhibit signal is further supplied from the output 25 of the access-control circuit 23 of the (next lower in hierarchy) signal source 2 and applied to the inputs 34 and 44 of the respective access-control circuits 33 and 43. Similarly, as in the signal source 2, the signal sources 3, 4 are also inhibited at the same switching instant for the supply of picture data via their picture signal outputs 31, 41 to the picture signal line group 7.

In addition, the arrangement shown in the Figure includes a what is commonly referred to as a $I^2C$-bus, shown by broken lines, or a similar control line group 10 of a further control system via which static, that is to say slow control commands which are not correlated with the picture data clock signal, are applied to the respective signal sources 1, 2, 3 and 4. These control commands can adjust the arrangement shown in the Figure for a long period of time to the mode of operation using one of the signal sources 1, 2, 3 and 4, respectively, but this adjustment is not correlated with the picture data clock signal. The control commands on the control line group 10 form an additional selection criterion for the decision which one of the signal sources 3 and 4 is to be enabled for the transmission of picture data, as these signal sources are arranged with equal priority in the chain circuit of the access-control circuits 13, 23, 33 and 43, respectively. Thus, the control commands on the control line group 10 can effect a long-term, uncorrelated preselection of the signal sources 3 and 4, respectively, whereas the temporarily defined change-over via the access-control circuits 33 and 43, respectively, is effected subsequent thereto.

The signal source 4 of the embodiment includes a clock signal source 46 which applies the picture data clock signal and the line synchronizing signal to the synchronizing line group 8 via the synchronizing signal output 42. The clock signal source 46 is additionally connected via a bidirectional active connection 47 to an arrangement 48 which supplies the digital television signal from the signal source 4. Preferably, this arrangement 48 is a television broadcast receiving device, which converts a television signal received into digital picture data which can be supplied from the picture signal output 41 and synchronizes the phase of the picture data clock signal from the clock signal source 46 via the active connection 47. Via the synchronizing line group 8, this picture data clock signal also controls all the further signal sources 1, 2, 3 and also the signal sinks 5, 6. In addition also the line synchronizing signal is synchronized from the clock signal source 46 of the arrangement 48, so that in addition the further signal sources and signal sinks of the embodiment including the signal source 4 and the digital television signal produced thereby can be coupled with the line frequency.

In a specific embodiment, the signal source 1 is constituted by a picture signal processing circuit which processes and shapes partly or completely, more specifically at a reduced display scale, one or a plurality of television pictures from one or a plurality of program sources, in which they can be inserted into a picture display device. Using arrangements of this type, it is possible to insert particular character symbols or running pictures of a different transmitter into a television picture which is predominantly displayed in the picture display device ("picture-in-picture", display of characters or transmitter identifications). As the picture data to be inserted have in all cases priority over the mainly displayed picture, the assigned signal source 1 is connected at the beginning, i.e. to the position having the highest priority in the chain circuit of the access-control circuits 13, 23, 33 and 43, respectively, and consequently the associated signal sources 1, 2, 3 and 4. To that end, the input 14 of the access-control circuit 13 of the signal source 1 is connected to ground, so that the access-control circuit 13 cannot receive external inhibit signals.

In the specific example, a circuit arrangement for feeding-in digital television signals from an external program source, more specifically a video recording and display device is used as the signal source 2 having the next lower priority. The signal sources 3 and 4 are formed by television broadcast-receiving arrangement for television signals of different standards. Then each individual one of the signal sources 3, 4 itself can again be of such a structure that it can receive several different standards. The signal source 3 has a special function to receive and decode a television signal in accordance with one of the MAC-standards, while a digital multi-standard decoder acts as a signal source 4 more specifically for the conversion of the television signals in accordance with the PAL and the SECAM standard.

However, as is shown by the arrows at the lower edge of the Figure in the representation of the picture signal line group 7, of the synchronization signal line group 8 and the control line group 10 of the further control system, more specifically of the I²C-bus, and also by the arrows and the broken-line extension of the outputs 35 and 45 respectively, of the respective access-control circuits 33 and 43, the overall arrangement of the present embodiment can be extended by further signal sources, and also by additional signal sinks.

The signal sinks 5, 6 in the above example are formed by a picture display device (signal sink 5), preferably with picture store and picture signal handling, and also by a deflection unit (signal sink 6). By way of further signal sinks, not shown, further picture display devices or video recorders or similar devices can be used.

The picture signal line group 7 in the present, special example comprises eight parallel data lines for the digital picture data of the luminance signal, which is transmitted in data words of eight bits each at a picture data clock rate of 13.5 MHz. As the majority of picture data are used for the luminance signal, this also determines the picture data clock rate, that is to say the repetition rate of the picture data of the individual picture elements. The parallel transmission of all the data bits of a picture data word is therefore recommended for a simple transmission at a lowest possible picture data clock rate.

The picture signal line group 7 also includes lines for the transmission of the picture data assigned to the color signals. Two color signals U and V are, for example, present whose picture data are comprised in individual data words of eight data bits each. Consequently, the color signals have the same resolution in the signal value gradation as the luminance signals; preferably however only one data word of each of the color signals is omitted out of a plurality of data words of the luminance signal, i.e. from a plurality of picture elements in the picture to be displayed. The number of parallel lines in the picture signal line group of the picture data associated to the color signals is reduced in the same ratio relative to the number of lines for the picture data of the luminance signal. A data word of a color signal is then transmitted in time division multiplex in a plurality of steps via this second number of lines of the picture signal line group. Depending on the quality requirements of the picture display different data formats are then conceivable, to which the arrangement can be adapted in a simple manner in accordance with the embodiment described.

In addition to the picture data, a picture synchronizing signal which characterizes the picture and also the field frequency—depending on the standard transmitted—in the picture data stream is supplied on the picture signal line group 7 of each one of the respective signal sources 1, 2, 3 and 4. As a result thereof, the picture frequency can be maintained in a simple and reliable manner without additional cost and design efforts for the synchronization in any operating mode of the arrangement described.

The picture data clock signal applied by the clock signal source 46 via the synchronizing line group 8 has a frequency of 13.5 MHz which corresponds to the picture data clock rate. Preferably, the picture data clock signal can alternatively assume a frequency, for example 27 MHz, which corresponds to a multiple of the picture data clock rate. The line synchronizing signal, which is furthermore transmitted via the synchronizing line group 8, has its phase correlated with the picture data clock signal. Both signals are not only applied to the signal sources 1 to 3, but also to the signal sinks 5, 6 via the synchronizing signal inputs 52 and 62, respectively.

To produce the deflection voltages for a picture display device, the signal sink 6 only needs all the synchronizing signals; consequently only the picture synchronizing signal is applied from the picture signal line group 7 to this signal sink via the picture signal input 61.

In addition, further synchronizing and/or control signals can be transmitted in a time-interleaved manner with the synchronizing signals described via the picture signal line group, more specifically the line for the picture synchronizing signal, and also via the synchronizing signal line group and there more particularly via the line for the line synchronizing signal. Preferably, the transmission of a data code which characterizes the frequency of the picture data clock signal and/or the picture data clock rate is preferably provided for the line of the line synchronizing signals; especially identifications of the field just transmitted (when the interlaced line method is used) are conveyed via the line for the picture synchronizing signal. In addition thereto both the picture signal line group 7 and the synchronizing line group 8 may include further lines for the transmission of additional control signals or similar signals.

Whereas the lines of the synchronizing line group 8 have a continuous by active connection to all the connected modules, that is to say signal sources and signal sinks, the signal sources are combined via their picture signal outputs 11, 21, 31 and 41, respectively, via what are commonly denoted "tri-state terminals" with the picture signal line group 7. These tri-state terminals are switched to the highly resistive state by the inhibit signals when the relevant signal source is inhibited for the supply of picture data.

I claim:

1. An arrangement for transmitting digital television signals from a plurality of signal sources to at least one signal sink, characterized in that said arrangement comprises:

a picture signal bus being permanently and directly connected to said plurality of signal sources and to said at least one signal sink for transmitting luminance and color signals encoded as digital picture data from always one optional signal source from the signal sources;

a synchronizing signal bus being permanently and directly connected to said plurality of signal sources and to said at least one signal sink for transmitting a picture data clock signal and a line synchronizing signal from a clock signal source;

and an access-control having, for each signal source, an access-control circuit for supplying an output inhibit signal from an inhibit signal output when an input inhibit signal is applied to an inhibit signal input or when digital picture data from the associated signal source is available there for transmission and, when said input inhibit signal is present at its inhibit signal input, for inhibiting the associated signal source to supply digital picutre data in a predetermined temporal correlation with the picture data clock signal, and in like manner for enabling the associated signal source after the input inhibit signal has disappeared, all the access-control circuits having their inhibit signal inputs and their inhibit signal outputs incorporated in a chain circuit which determines the priority of the signal sources for the transmission.

2. An arrangement as claimed in claim 1, wherein further synchronizing and/or control signals, a picture synchronizing signal in particular, are transmittable via the picture signal line group.

3. An arrangement as claimed in claim 1 or 2, wherein lines which are arranged fro the transmission of the line and/or the picture synchronizing signal are additionally used for the time-interleaved transmission of further signals.

4. An arrangement as claimed in claim 1, wherein the clock signal source is comprised in one given source of the signal sources.

5. An arrangement as claimed in claim 2, wherein the picture synchronizing signal can be derived from one of the signal sources from the television signal supplied thereby.

6. An arrangement as claimed in claim 1, wherein the picture data assigned to the luminance signal can be transmitted in parallel via a first number of lines and the picture data assigned to the color signals can be transmitted in parallel or in time-division multiplex via a second number of lines of the picture signal.

7. A signal source for supplying digital picture signals, comprising:

a picture signal output for supplying signal encoded as digital picture data;

a synchronizing input for receiving a picture data clock signal and a line synchronizing signal; and an access-control circuit for supplying an output inhibit signal from an inhibit signal output when an input inhibit signal is applied to an inhibit signal input or when digital picture data from the signal source is available there for transmission, and, when said input inhibit signal is present at its inhibit signal input, for inhibiting the signal source to supply digital picture data in a predetermined temporal correlation with the picture data clock signal, and for enabling said signal source in like manner after the input inhibit signal has disappeared.

8. A signal for supplying digital picture signals, comprising:

a picture signal output for supplying signals encoded as digital picture data;

a synchronizing signal output for supplying a picture data clock signal and a line synchronizing signal; and an access-control circuit for supplying an output inhibit signal from an inhibit signal output when an input inhibit signal is applied to an inhibit signal input or when digital picture data from the signal source is available there for transmission, and, when said input inhibit signal is present at its inhibit signal input, for inhibiting the signal source to supply digital picture data in a predetermined temporal correlation with the picture data clock signal, and for enabling said signal source in like manner after the input inhibit signal has disappeared.

* * * * *